(12) United States Patent
Sato (10) Patent No.: US 7,894,600 B2
(45) Date of Patent: Feb. 22, 2011

(54) ENCRYPTING APPARATUS AND ENCRYPTING METHOD

(75) Inventor: Hideo Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 875 days.

(21) Appl. No.: 10/553,984

(22) PCT Filed: Dec. 22, 2004

(86) PCT No.: PCT/JP2004/019713

§ 371 (c)(1),
(2), (4) Date: Oct. 20, 2005

(87) PCT Pub. No.: WO2005/081450

PCT Pub. Date: Sep. 1, 2005

(65) Prior Publication Data

US 2006/0233357 A1     Oct. 19, 2006

(30) Foreign Application Priority Data

Feb. 24, 2004     (JP) .............................. 2004-048457

(51) Int. Cl.
*H04L 9/00* (2006.01)
(52) U.S. Cl. .......................... 380/44; 380/56; 359/599; 356/71
(58) Field of Classification Search ................... 380/28, 380/44, 277
See application file for complete search history.

(56) References Cited

U.S. PATENT DOCUMENTS

| | | | | |
|---|---|---|---|---|
| 5,545,886 A | * | 8/1996 | Metlitsky et al. ........ | 235/462.42 |
| 5,680,460 A | * | 10/1997 | Tomko et al. ................ | 713/186 |
| 5,822,432 A | * | 10/1998 | Moskowitz et al. ........... | 380/28 |
| 5,841,865 A | * | 11/1998 | Sudia .......................... | 380/286 |
| 6,035,398 A | * | 3/2000 | Bjorn .......................... | 713/186 |
| 6,317,834 B1 | * | 11/2001 | Gennaro et al. ............. | 713/186 |
| 6,363,485 B1 | * | 3/2002 | Adams et al. ............... | 713/186 |

(Continued)

FOREIGN PATENT DOCUMENTS

JP     2001-216045     8/2001

(Continued)

OTHER PUBLICATIONS

Lawrence O'Gorman, "Comparing Passwords, Tokens, and Biometrics for User Authentication", Proceedings of the IEEE, vol. 91, No. 12, XP-002431667, Dec. 2003, pp. 2021-2040.

(Continued)

*Primary Examiner*—Ponnoreay Pich
*Assistant Examiner*—John B King
(74) *Attorney, Agent, or Firm*—Oblon, Spivak, McClelland, Maier & Neustadt, L.L.P.

(57) ABSTRACT

To propose an encryption device and encryption method capable of improving reliability of an encryption function. An element-specific parameter unique to a solid imaging element is created based on a uniform image signal S2 output from the solid imaging element as a result of imaging a uniform imaging target with the imaging unit 11, and identification information D1 is encrypted with encryption key information D2 extracted from this element-specific parameter, thereby being capable of ensuring confidentiality of the identification information D1 and thus improving reliability of an encryption function.

12 Claims, 4 Drawing Sheets

U.S. PATENT DOCUMENTS

| | | | |
|---|---|---|---|
| 6,687,375 B1* | 2/2004 | Matyas et al. | 380/45 |
| 7,278,016 B1* | 10/2007 | Detrick et al. | 713/2 |
| 2001/0034836 A1* | 10/2001 | Matsumoto et al. | 713/176 |
| 2002/0009213 A1* | 1/2002 | Rowe et al. | 382/115 |
| 2002/0014530 A1* | 2/2002 | Iihama | 235/454 |
| 2002/0023215 A1* | 2/2002 | Wang et al. | 713/171 |
| 2002/0024453 A1 | 2/2002 | Maeda | |
| 2002/0040350 A1* | 4/2002 | Shinzaki | 705/74 |
| 2002/0087325 A1* | 7/2002 | Lee et al. | 704/270.1 |
| 2002/0146122 A1* | 10/2002 | Vestergaard et al. | 380/231 |
| 2002/0174348 A1* | 11/2002 | Ting | 713/186 |
| 2002/0176583 A1* | 11/2002 | Buttiker | 380/282 |
| 2002/0184509 A1* | 12/2002 | Scheidt et al. | 713/185 |
| 2002/0191091 A1 | 12/2002 | Raynor | |
| 2003/0005310 A1* | 1/2003 | Shinzaki | 713/186 |
| 2003/0056122 A1* | 3/2003 | Wuidart | 713/202 |
| 2003/0103629 A1* | 6/2003 | Wuidart et al. | 380/265 |
| 2003/0221097 A1* | 11/2003 | Nakano et al. | 713/150 |
| 2004/0078570 A1* | 4/2004 | Geiringer et al. | 713/165 |
| 2004/0111607 A1* | 6/2004 | Yellepeddy | 713/155 |
| 2006/0224898 A1* | 10/2006 | Ahmed | 713/186 |
| 2008/0016370 A1* | 1/2008 | Libin et al. | 713/185 |

FOREIGN PATENT DOCUMENTS

| | | |
|---|---|---|
| JP | 2002-73424 | 3/2002 |
| JP | 2003-248578 | 9/2003 |

OTHER PUBLICATIONS

Blaise Gassend, et al., "Controlled Physical Random Functions", Proceedings fo the 18$^{th}$ Annual Computer Security Applications Conference (ACSAC'02), XP-010627027, Dec. 9, 2002, pp. 149-160.

"Fingertip authentication", Mobile Payments World, XP-002431668, Feb. 5, 2004, 1 page.

* cited by examiner

ENCRYPTING APPARATUS AND ENCRYPTING METHOD

TECHNICAL FIELD

This invention relates to an encryption device and an encryption method and, more particularly, applied to a case of encrypting information (hereinafter, referred to as identification information) that is used to prove validly of an identification target.

BACKGROUND ART

Heretofore, an encryption device adopting a secret key encryption method or a public key encryption method is designed to create encrypted identification information by performing prescribed encryption on identification by using encryption key information being stored in an internal non-volatile memory and send this to a decryption device.

In this case, the encryption device ensures reliability of an encryption function by preventing encryption key information being stored in the non-volatile memory from being stolen. As a method of preventing the encryption key information from being stolen, a non-volatile memory is installed between units at a deep part of the encryption device, or a non-volatile memory and an encryption/decryption unit for encrypting encryption key information only when the information is stored in the non-volatile memory are installed as one tip (for example, refer to Patent Reference 1).

Patent Reference 1 Japanese Patent Laid-open No. 2003-256282

However, such an encryption device is not enough to offer reliability of an encryption function because not only installation of a non-volatile memory is complicated but also encryption key information cannot be prevented from being stolen from the non-volatile memory.

This invention has been made in view of foregoing and proposes an encryption device and encryption method capable of improving reliability of an encryption function.

To solve the above problem, this invention provides an encryption device for encrypting information on a confidential target with: a creation means for creating a unique parameter of an element group, based on a signal output from the element group internally having a plurality of elements as a unit; and an encryption means for encrypting information by using the unique parameter created by the creation means.

Further, this invention provides an encryption method of encrypting information on a confidential target with: a first step of creating a unique parameter of an element group, based on a signal output from the element group internally having a plurality of elements as a unit; and a second step of encrypting information by using the created unique parameter.

As described above, according to this invention, information is encrypted by using a unique parameter of an internal element group. This means that encryption can be performed by using a unique parameter that third parties cannot detect, even in manufacturing, without previously storing the parameter in a non-volatile memory or the like, thereby being capable of easily ensuring confidentiality of identification information D1 and thus improving reliability of an encryption function.

BEST MODE FOR CARRYING OUT THE INVENTION

One embodiment of this invention will be described in detail with reference to the accompanying drawings.

(1) Construction of Identification System

Figure 1:
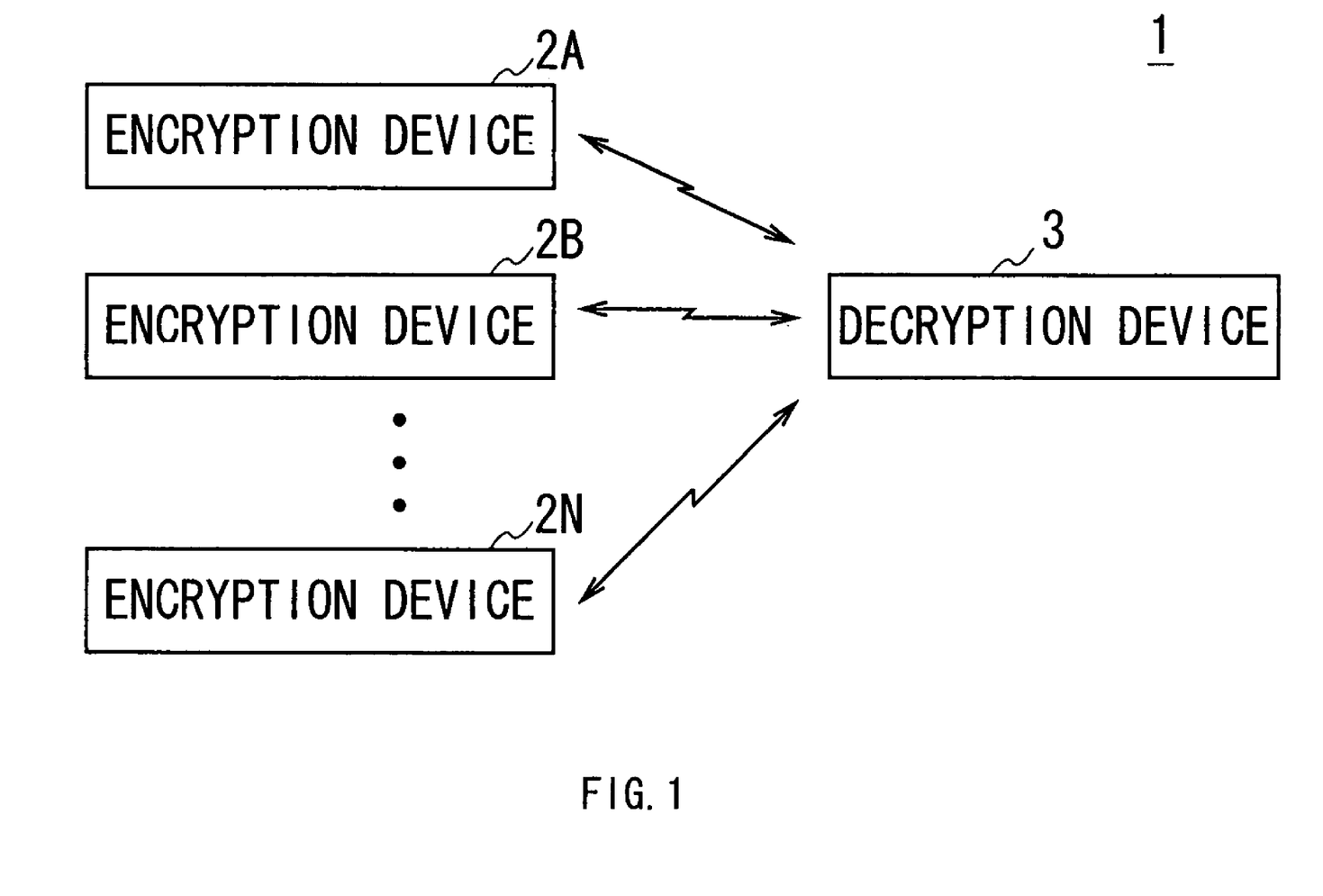
FIG. 1 is a block diagram showing a construction of an identification system.

Referring to FIG. 1, reference numeral 1 shows an identification system according to this embodiment, in which a plurality of encryption devices 2 (2A to 2N) serving as communication sources are wirelessly connected to a decryption device 3 serving as a communication party so that the encryption devices 2 and the decryption device 3 can communicate various kinds of information with each other.

In this case, an encryption device 2 creates a characteristic pattern of a prescribed part of a user using this encryption device 2 as identification information when starting communication with the decryption device 3. Then the encryption device 2 creates encrypted identification information by encrypting this identification information and sends this to the decryption device 3.

The decryption device 3, on the other hand, restores the identification information by decrypting the received encrypted identification information, and compares this identification information with corresponding registered information previously registered.

The decryption device 3 continues the communication of information with the encryption device 2 only when it is determined based on the comparison result that the user using the encryption device 2 sending the identification information is a rightful registrant.

As described above, in this identification system 1, validity of a user using the encryption device 2 is determined by using body information on the user.

(2) Construction of Encryption Device

Figure 2:
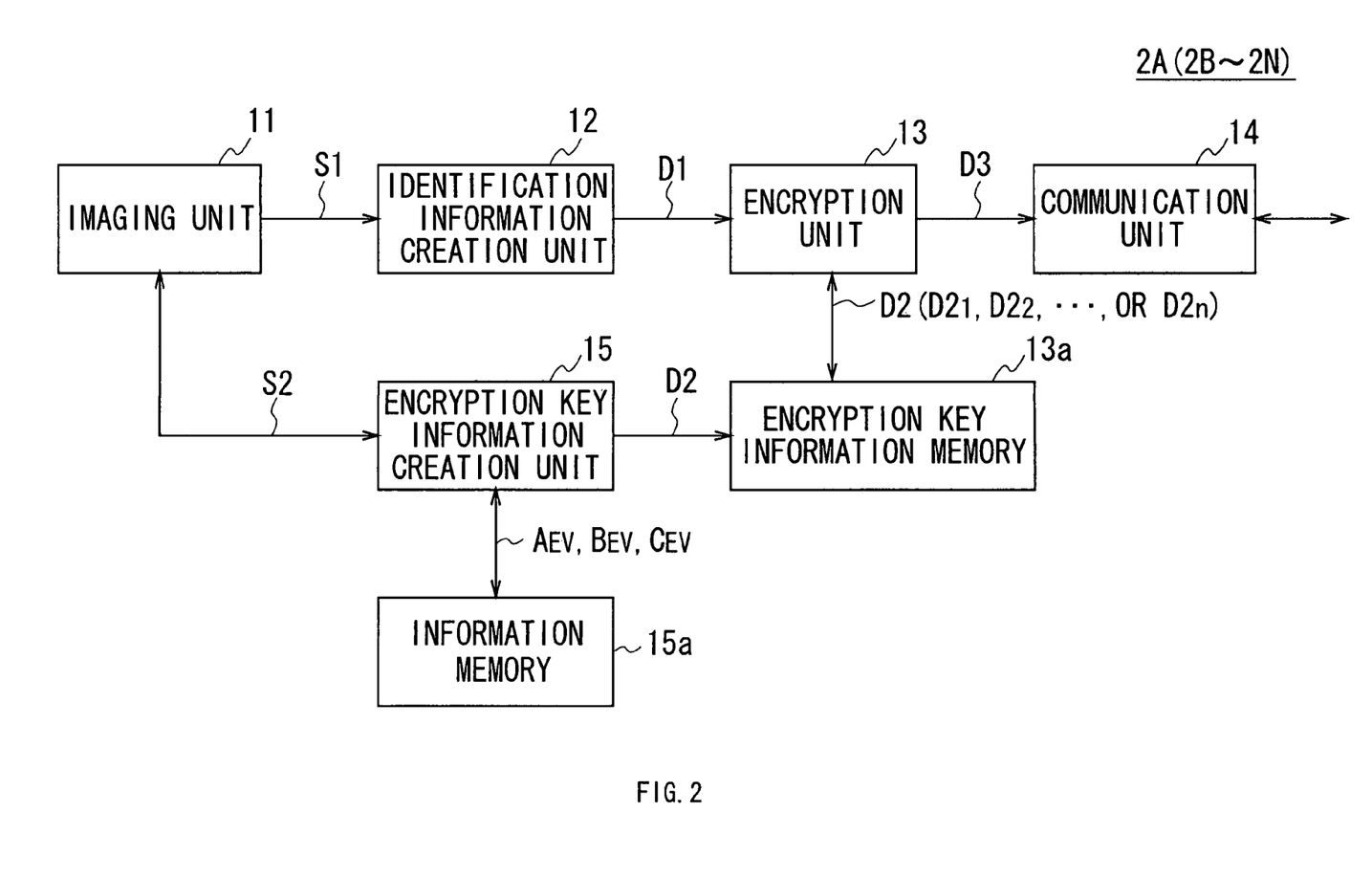
FIG. 2 is a block diagram showing a construction of an encryption device according to this embodiment.

Since the encryption devices 2 (2A to 2N) are identical, the construction of the encryption device 2A will be now described.

Referring to FIG. 2, the encryption device 2A is composed of an imaging unit 11 for imaging blood vessels inside a finger as an imaging target, an identification information creation unit 12 for creating identification information based on the imaging result of the imaging unit 11, an encryption unit 13 for encrypting the identification information, and a communication unit 14 for communicating information through a communication process with a prescribed radio communication scheme.

This imaging unit 11 is designed to image blood vessels by using such a feature that light (near-infrared light) of near-infrared light bandwidth is specifically absorbed in deoxygenization hemoglobin (venous blood) or oxygenation hemoglobin (arterial blood) in the blood vessels.

Figure 3:
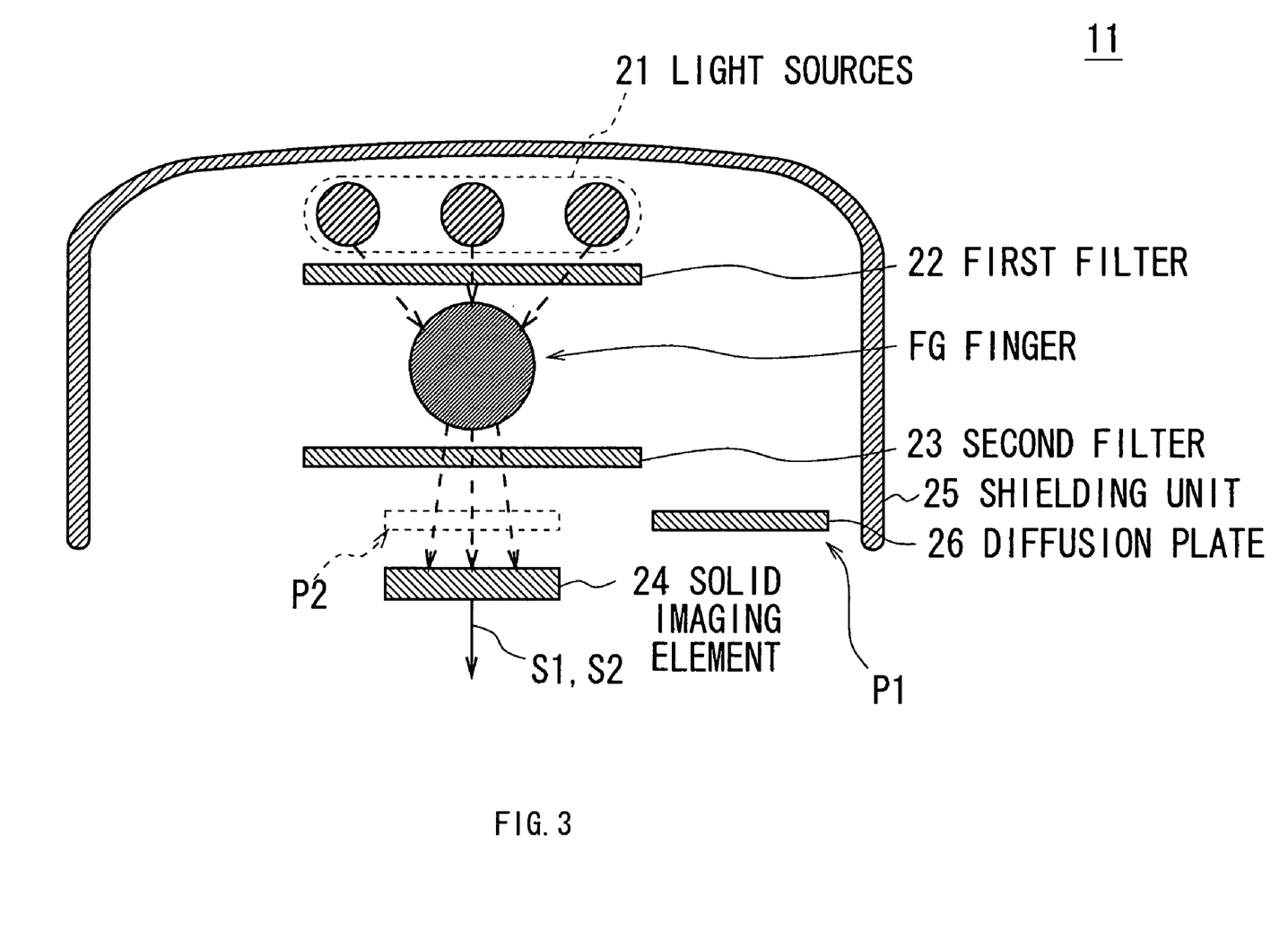
FIG. 3 is a schematic diagram showing a construction of an imaging unit.

In actual, as shown in FIG. 3, the imaging unit 11 has one or two or more light sources 21 for emitting near-infrared light (three light sources are shown in FIG. 3). On the light path of the near-infrared light which is emitted from the light sources 21, a first filter 22 for allowing specific light of near-infrared light bandwidth out of the near-infrared light to pass therethrough, a second filter 23 for allowing light of near-infrared light bandwidth which is absorbed in venous bloods and its adjacent light out of light obtained via the first filter 22 to pass therethrough, and a solid imaging element 24 are provided in order.

In addition, the imaging unit 11 is provided with a diffusion plate 26 at a position (hereinafter, referred to as out-of-light-path position) P1 other than on the light path of the near-infrared light. This diffusion plate 26 can move between the out-of-light-path position P1 and a position (hereinafter, referred to as on-light-path position) P2 a prescribed distance away from the solid imaging element 24.

Furthermore, in this imaging unit 11, a finger FG can be inserted between the first filter 22 and the second filter 23, and a shielding unit 25 for blocking the outside light in the air out of the light path of the near-infrared light while the finger FG is inserted is provided, thereby being capable of reducing influences of visible light and ultraviolet radiation existing out of the shielding unit 25 on the near-infrared light in imaging the blood vessels inside the finger FG.

In this case, when the imaging unit 11 receives an imaging command while the finger FG is inserted between the first and second filters 22 and 23, it emits near-infrared light from the light sources 21 and irradiates the finger FG with the light via the first filter 22.

Since this near-infrared light is specifically absorbed in intrinsic hemoglobin in the blood vessel tissues inside the finger FG, the near-infrared light obtained through the finger FG enters the solid imaging element 24 via the second filter 23 as a blood vessel pattern light representing a formation pattern of the blood vessel tissues.

Then the imaging unit 11 performs photoelectric conversion on the blood vessel pattern light with a plurality of photoelectric conversion elements arranged in the solid imaging element 24, and sends a blood vessel image signal S1 created by the photoelectric conversion elements to the identification information creation unit 12 (FIG. 2).

In this way, the imaging unit 11 can image blood vessels inside a body as an imaging target.

The identification information creation unit 12 creates blood vessel image data by performing A/D (Analog/Digital) conversion on the received blood vessel image signal S1, and extracts blood vessels of a previously specified region from the blood vessel image based on the blood vessel image data. Then the identification information creation unit 12 creates a formation pattern of the extracted blood vessels as identification information D1 and sends this to the encryption unit 13.

The encryption unit 13 has a memory (hereinafter, referred to as encryption key information memory) 13a for storing a plurality of encryption key information sequentially created with a prescribed algorithm, and selects and reads, for example, encryption key information D21 corresponding to a request made from the decryption device 3 (FIG. 1) via the communication unit 14, from the plurality of encryption key information D2 ($D2_1$ to $D2_n$) being stored in the encryption key information memory 13a.

Then the encryption unit 13 creates encrypted identification information D3 by encrypting the received identification information D1 by using the read encryption key information $D2_1$ with, for example, the AES (Advanced Encryption Standard), and sends this to the decryption device 3 (FIG. 1) via the communication unit 14.

Since the encryption device 2A creates the identification information D1 representing a blood vessel formation pattern unique to an inside of the body in this way, direct stealing from a body can be prevented as compared with a case of creating fingerprints existing on a surface of a body as identification information, thus being capable of previously preventing a user using the encryption device 2A from pretending he/she is a registrant.

(3) Encryption Key Information Creation Process

In addition to the above configuration, this encryption device 2A is designed to create a plurality of encryption key information D2 ($D2_1$ to $D2_n$) unique to this encryption device 2A based on a result of imaging a uniform imaging target with the imaging unit 11.

In this case, the encryption device 2A is designed to perform a prescribed encryption key information creation process every time when receiving a creation request of encryption key information via the communication unit 14 from the decryption device 3 (FIG. 1), and store or update the created encryption key information D2 in the encryption key information memory 13a of the encryption unit 13. An encryption key information creation unit 15 for performing this encryption key information creation process will be now described.

When the decryption device 3 makes a creation request, the encryption key information creation unit 15 makes the imaging unit 11 image a uniform imaging target, and creates encryption key information based on a signal which is obtained as the imaging result.

In actual, the encryption key information creation unit 15 controls the diffusion plate 26 of the imaging unit 11 (FIG. 3) so as to move from the out-of-light-path position P1 to the on-light-path position P2, and sends an imaging command to the imaging unit 11.

In this case, in the imaging unit 11 (FIG. 3), the diffusion plate 26 is irradiated with near-infrared light emitted from the light sources 21 via the first and second filters 22 and 23 in order, and diffuses the light toward the solid imaging element 24 as uniform diffused light (hereinafter, referred to as uniform diffused light), so that the light enters the solid imaging element 24.

This solid imaging element 24 is provided with openings and light collective lens corresponding to a plurality of photoelectric conversion elements arranged in a matrix in the solid imaging element 24. These openings and light collective lens have different sizes due to various causes in manufacturing and this variation is unique to the solid imaging element 24.

Therefore, a signal (hereinafter, referred to as uniform image signal) S2 input to the encryption key information creation unit 15 (FIG. 2) as a result of performing the photoelectric conversion on the uniform diffused light at the solid imaging element 24 includes the variation unique to the solid imaging element 24, which cannot be known in manufacturing, as a noise pattern (hereinafter, referred to as variation pattern).

The encryption key information creation unit 15 creates uniform image data by performing the A/D conversion on the uniform image signal S2 obtained as described above, and creates a parameter (hereinafter, referred to as element-specific parameter) attribute to the unique variation pattern of the solid imaging element 24 based on the unique image data.

In this embodiment, as a method of creating the element-specific parameter, the encryption key information creation unit 15 calculates a hamming distance of a uniform image data and a prescribed evaluation pattern data and creates an element-specific parameter from the calculation result.

Specifically, the encryption key information creation unit 15 has an information memory 15a storing, for example, three data strings which are different in hamming_distance, as evaluation patterns $A_{EV}$, $B_{EV}$, and $C_{EV}$. By using these evaluation patterns $A_{EV}$, $B_{EV}$, and $C_{EV}$, taking as "X" higher-ranked uniform image data (hereinafter, referred to as higher-ranked uniform image data) of the same data length as the evaluation patterns out of the uniform image data, and taking an eXclusive OR (XOR) as "^", and with the following equation, $$dH(x, A_{EV}) = \Sigma xi \char`\^ Ai = Xa$$

$$dH(x, B_{EV}) = \Sigma xi \char`\^ Bi = Xb$$

$$dH(x, C_{EV}) = \Sigma xi \char`\^ Ci = Xc \qquad (1)$$

where i=1 to n the encryption key information creation unit 15 calculates the hamming distance Xa, Xb, Xc of the higher-ranked uniform image data Z and each of the evaluation patterns $A_{EV}$, $B_{EV}$, and $C_{EV}$, and combines the hamming distances Xa, Xb and Xc, thereby creating an element-specific parameter.

In this case, the encryption key information creation unit 15 can keep repeatability of the element-specific parameter obtained due to a variation pattern even in a case where uniform image data varies according to the imaging situations at the time of imaging. This is because the element-specific parameter is created from correlation results between the higher-ranked uniform image data X and the evaluation patterns $A_{EV}$, $B_{EV}$, and $C_{EV}$.

In addition, in this case, the encryption key information creation unit 15 creates an element-specific parameter based on a uniform image signal S2 output from the solid imaging element 24 after manufacturing. Therefore, this parameter can be created as information which the manufacturer of the solid imaging element 24 cannot be know. Furthermore, the element-specific parameter is created from a combination of correlation results with the evaluation patterns $A_{EV}$, $B_{EV}$, and $C_{EV}$, not with a variation pattern itself of the solid imaging element 24. Therefore, this parameter can be created as information that the manufacturer of this solid imaging element 24 and a person who stole the solid imaging element 24 cannot know.

Then the encryption key information creation unit 15 creates a plurality of encryption key information D2 ($D2_1$ to $D2_n$) with a prescribed algorithm with thus created element-specific parameter as a seed, and stores or updates the encryption key information D2 in the encryption key information memory 13a of the encryption unit 13.

As a result, the identification information D1 to be given to the encryption unit 13 is converted to encrypted identification information D3 through an encryption process using, for example, encryption key information $D2_1$ unique to this encryption device (solid imaging element 24), and this information is sent to the decryption device 3 via the communication unit 14.

Note that, when the encryption key information creation unit 15 creates a plurality of new encryption key information D2, it can register the plurality of new encryption key information D2 in a database of the decryption device 3 with a prescribed process or by performing a prescribed encryption process on the encryption key information D2 and sending the resultant to the decryption device 3.

As described above, this encryption device 2 encrypts the identification information D1 by using the encryption key information D2 extracted from the element-specific parameter that cannot be known in manufacturing, thus making it possible to significantly improve reliability of an encryption function by strictly avoiding a user pretending a registrant from using the encryption device 2.

(4) Construction of Decryption Device

Figure 4:
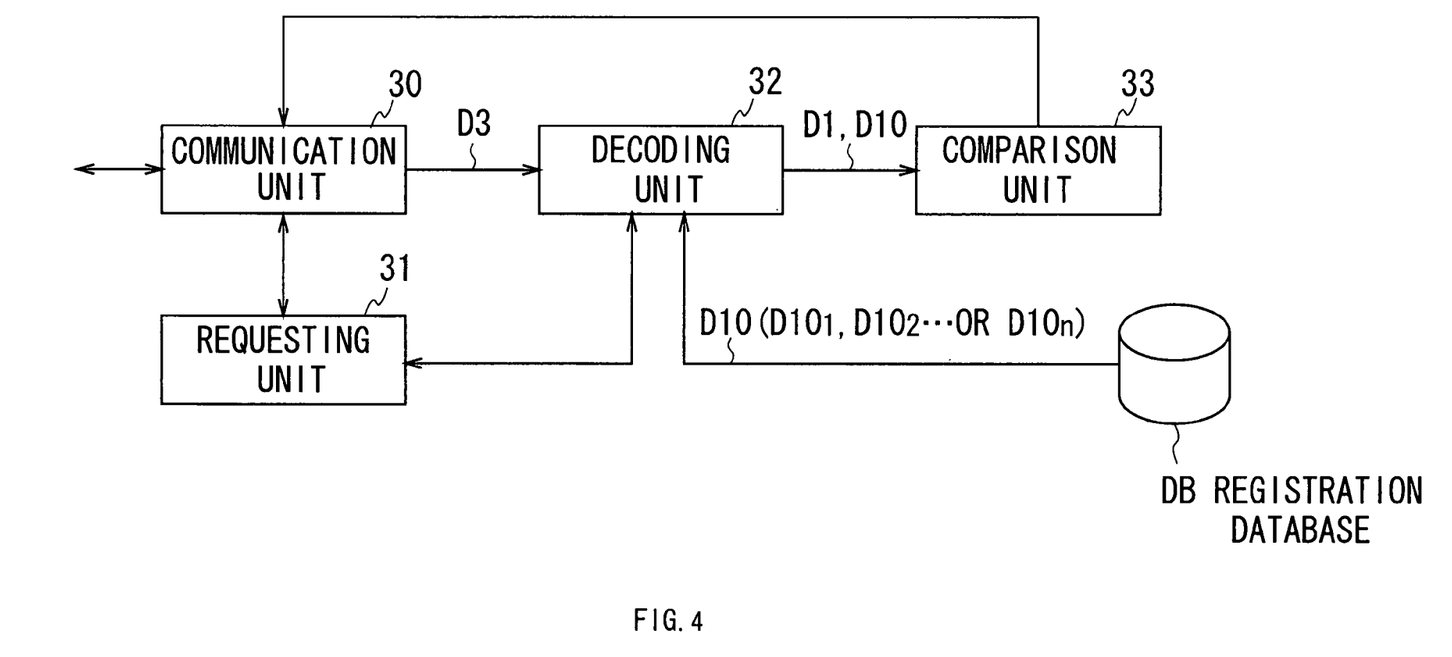
FIG. 4 is a block diagram showing a construction of a decryption device.

The decryption device 3 is composed of a communication unit 30 for communicating information through a communication process under a prescribed radio communication scheme, a requesting unit 31 for making various requests to the encryption devices 2 (2A to 2N), a decoding unit 32 for decrypting encrypted identification information D3 received via the communication unit 30, a comparison unit 33 for performing a prescribed identification process by using a decryption result of the decoding unit 32, and a registration database DB.

This registration database DB stores the formation patterns of blood vessels of the same parts as the blood vessels to be imaged by the imaging units 11 of the encryption devices 2 (2A to 2N) and a plurality of encryption key information D2 obtained from the same element-specific parameters of the solid imaging elements 24 of the encryption devices 2 (2A to 2N) as registration information D10 ($D10_1$ to $D10_n$).

In this case, the requesting unit 31 requests an encryption device 2 (2A to 2N) being connected via the communication unit 30, for various conditions for an identification process at prescribed timing. The conditions include the number of encryption key information $D2_1, D2_2, \ldots, D2_n$ to be used out of a plurality of encryption key information, and other matters. In this case, the decryption unit 32 is notified of the number of specified encryption key information.

In addition, the requesting unit 31 makes a request for creating encryption key information D2 if needed. In this case, encryption key information D2 of corresponding registration information $D10_1, D10_2, \ldots,$ or $D10_n$ being registered in the registration database DB is updated to encryption key information which is newly created by the encryption device 2 and is obtained through a prescribed registration process or via the communication unit 30.

The decoding_unit 32 reads registration information $D10_1$ corresponding to, for example, the encryption device 2A from the registration database DB based on a transmission source address written in the header of encryption identification information D3 supplied via the communication unit 30, and selects encryption information $D2_1$ notified from the requesting unit 31 out of the plurality of encryption key information $D2_1$ to $D2_n$ of the registration information $D10_1$.

The decoding unit 32 restores the identification information D1 by performing the same encryption process as the encryption device 2A, on the encrypted identification information D3 by using the encryption key information $D2_1$ being selected, and sends the identification information D1 and corresponding registration information $D10_1$ to the comparison unit 33.

The comparison unit 33 compares the blood vessel formation pattern of the supplied identification information D1 to the blood vessel formation pattern of the corresponding registration information $D10_1$ with a prescribed technique. If the comparison result cannot satisfy a prescribed matching level, the user who is using the encryption device 2A and sent the identification information D1 is determined as a third party and the communication unit 30 is controlled so as to stop communication of information with the encryption device 2A.

When the prescribed matching level is obtained, the comparison unit 34 determines the user using the encryption device 2A sending the identification information D1 as a rightful user. In this case, the comparison unit 33 controls the communication unit 30 so as to communicate information between the encryption device 2A and an internal information processing unit (not shown).

As described above, the decryption device 3 is capable of performing the identification process by using the identification information D1 (blood vessel formation pattern) unique to a body and the encryption key information D2 obtained from an element-specific parameter unique to the solid imaging element 24.

(5) Operation and Effects of this Embodiment

According to the above configuration, this encryption device 2 (2A to 2N) creates an element-specific parameter unique to the solid imaging element 24 based on a uniform image signal S2 output from the solid imaging element 24 as a result of imaging a uniform imaging target by the imaging unit 11.

Then the encryption device 2 (2A to 2N) encrypts the identification information D1 by using the prescribed encryption key information D2 obtained from the element-specific parameter.

Therefore, the encryption device 2 (2A to 2N) is capable of creating encryption key information D2 obtained from the element-specific parameter, which can not be known by third parties even in manufacturing, without previously storing encryption keys in a non-volatile memory, unlike conventional systems, resulting in being capable of ensuring confidentiality of the identification information D1 easily.

According to the above configuration, an element-specific parameter unique to the solid imaging element 24 is created based on a uniform image signal S2 output from the solid imaging element 24 as a result of imaging a uniform imaging target, and the identification information D1 is encrypted with prescribed encryption key information D2 obtained from the element-specific parameter, thus being capable of ensuring confidentiality of the identification information D1 easily and improving reliability of the encryption function.

(6) Other Embodiments

Note that the above embodiment has described a case where a creation means for creating a unique parameter of an element group based on a signal output from the element group internally having a plurality of elements as a unit creates an element-specific parameter unique to the solid imaging element 24 based on a uniform image signal S2 output from a plurality of photoelectric conversion elements arranged in the solid imaging element 24. This invention, however, is not limited to this and a unique parameter can be created based on a signal output from, for example, a piezoelectric element group of a touch pad. Alternatively, a unique parameter of an element group having a group of active elements or passive elements as a unit can be created.

In this case, even if the element group is composed of one or plural kinds of elements, the same effects as the above embodiment can be obtained.

Further, the above embodiment has described a case where the creation means creates a unique parameter by directly calculating hamming distances (correlation values) between data of the uniform image signal S2 output from an element group and three different evaluation patterns $A_{EV}$, $B_{EV}$, and $C_{EV}$ being stored in an information memory serving as a storage means and combining the calculation results in a prescribed order. This invention, however, is not limited to this and FFT (Fast Fourier Transform) can be performed on data of the uniform image signal S2 and calculation results of hamming distances of this result and the evaluation patterns $A_{EV}$, $B_{EV}$, and $C_{EV}$ can be combined. Alternatively, an inverse FFT can be performed on only data of low frequency components out of a result of the FFT, and the results of hamming distances of the FFT result and the evaluation patterns $A_{EV}$, $B_{EV}$, and $C_{EV}$ can be combined. Or these processing results can be combined. By doing this, a unique parameter with high confidentiality and repeatability can be created, thus making is possible to significantly improve reliability of the encryption function.

In this case, the encryption key information creation unit 15 makes the imaging unit 11 image the diffusion plate 26 and creates a unique parameter as encryption key information based on a signal obtained as the imaging result. This invention, however, is not limited to this and the imaging unit 11 can image another uniform imaging target other than the diffusion plate 26, or only a unique parameter can be created without creating the encryption key information. In short, another kind of creation unit for creating a unique parameter can be used.

In addition, in this case, encryption key information is created every time when a request for creating encryption key information is received from the decryption device 3 via the communication unit 14. This invention, however, is not limited to this and other creation timing can be used, such as only manufacturing time.

Further, as an evaluation pattern, a prescribed evaluation pattern is stored in an information memory. This invention, however, is not limited to this and a plurality of evaluation patterns are stored in the information memory and a prescribed number of evaluation patterns can be selected from these evaluation patterns. Alternatively, a different evaluation pattern is selected according to a request of the decryption device 3. Alternatively, an evaluation pattern created with a prescribed algorithm at prescribed timing can be stored in the information memory. By doing this, even if identification information D1 is stolen or even if an evaluation pattern is decrypted from encryption key information, corresponding evaluation pattern cannot be used, thus making it possible to significantly improve reliability of the encryption function.

Furthermore, three kinds of evaluation patterns are stored in the information memory as the number of evaluation patterns. This invention, however, is not limited to this and the same effects as the above embodiment can be obtained, provided that at least two evaluation patterns are stored in the information memory.

Furthermore, the above embodiment has described a case where the encryption unit 13 for encrypting identification information D1 comprising a blood vessel formation pattern by using encryption key information extracted from a unique parameter is applied as an encryption means for encrypting information by using a unique parameter. This invention, however, is not limited to this and an encryption unit for encrypting the identification information D1 by using a unique parameter can be applied.

In this case, a blood vessel formation pattern in a body is encrypted as identification information D1. This invention, however, is not limited to this and another kind of body information such as characteristic pattern existing on a body surface, such as fingerprints, can be encrypted as identification information. In addition, not identification information nor body information but information which is a confidential target can be encrypted.

Industrial Usability

This invention can be used for terminal devices such as personal computers and portable telephones, and household electronic devices in a case of making external devices identify the devices themselves.

EXPLANATION OF REFERENCE NUMERALS

1 ... IDENTIFICATION SYSTEM, 2 ... ENCRYPTION DEVICE, 3 ... DECRYPTION DEVICE, 11 ... IMAGING UNIT, 12 ... IDENTIFICATION INFORMATION CREATION UNIT, 13 ... ENCRYPTION UNIT, 13a ... ENCRYPTION KEY INFORMATION MEMORY, 15 ... ENCRYPTION KEY INFORMATION CREATION UNIT, 15a ... INFORMATION MEMORY, 24 ... SOLID IMAGING ELEMENT

The invention claimed is:

1. An encryption device for encrypting information on a unique confidential target, comprising: an imaging unit including a movable diffusion plate and configured to perform imaging by emitting light on a target and to output analog first and second signals, the first signal including image data of an inside portion of the unique confidential target, the second signal including image data of a solid imaging element located inside the imaging unit to create variation patterns unique to the imaging unit, and the diffusion plate being movable into and out of a path of light emitted based on the signal being output by the imaging unit;

an identification unit configured to perform analog/digital conversion on the first signal having the image data of the inside portion of the unique confidential target to create identification information;

a creation unit configured to perform analog/digital conversion on the second signal having the variation patterns unique to the imaging unit by performing an algorithm on the second signal to create encryption key information;

and an encryption unit configured to encrypt the identification information by using the encryption key information.

2. The encryption device according to claim 1, further comprising:

a storage unit configured to store a plurality of predetermined evaluation patterns having different hamming distances, wherein the creation unit uses the plurality of predetermined evaluation patterns and at least one hamming distance of the image data of the second signal as a seed to create the encryption key information.

3. The encryption device according to claim 2, further comprising:

a communication unit configured to communicate with a prescribed communication party; and the creation unit is further configured to select evaluation patterns requested by the communication party, from the plurality of predetermined evaluation patterns stored in the storage unit.

4. The encryption device according to claim 1, wherein the imaging unit is further configured to project near-infrared light into the target.

5. The encryption device according to claim 1, wherein the first signal includes blood vessel pattern information representing a formation pattern of blood vessel tissues inside the target.

6. The encryption device according to claim 1, wherein the second signal includes data based on a signal output from a plurality of piezoelectric elements of a touch pad.

7. The encryption device according to claim 1, wherein the second signal includes data based on a signal output from a group of active elements.

8. The encryption device according to claim 1, wherein the second signal includes data based on a signal output from a group of passive elements.

9. An encryption method for encrypting information on a unique confidential target, comprising:

performing imaging on an inside portion of a target by emitting light on the target via an imaging unit;

outputting an analog first signal that includes image data of the inside portion of the unique confidential target;

outputting an analog second signal that includes image data of a solid imaging element located inside the imaging unit to create variation patterns unique to the imaging unit;

moving a diffusion plate into and out of a path of light emitted based on the signal being output by the imaging unit;

performing analog/digital conversion on the first signal having the image data of the inside portion of the unique confidential target to create identification information;

performing analog/digital conversion on the second signal having the variation patterns unique to the imaging unit to create encryption key information by performing an algorithm on the second signal; and encrypting via a processor the identification information by using the encryption key information.

10. The encryption method according to claim 9, further comprising:

storing a plurality of predetermined evaluation patterns having different hamming distances; and creating the encryption key information using at least one hamming distance of the image data of the second signal and the plurality of predetermined evaluation patterns as a seed.

11. The encryption method according to claim 10, further comprising:

selecting evaluation patterns requested by a prescribed communication party, from the plurality of predetermined evaluation patterns being stored.

12. An encryption device for encrypting information on a unique confidential target, comprising:

imaging means for performing imaging by emitting light on a target and outputting analog first and second signals, the first signal including image data of an inside portion of the unique confidential target, and the second signal including image data of a solid imaging element located inside the imaging unit to create variation patterns unique to the imaging means;

diffusion means for moving a diffusion plate into and out of a path of light emitted based on the signal being output by the imaging unit;

identification means for performing analog/digital conversion on the first signal having the image data of the inside portion of the unique confidential target to create identification information;

creation means for performing analog/digital conversion on the second signal having the variation patterns unique to the imaging means to create encryption key information by performing an algorithm on the second signal; and encryption means for encrypting the identification information by using the encryption key information.

* * * * *